(12) United States Patent  (10) Patent No.: US 8,562,321 B2
Urata et al.  (45) Date of Patent: Oct. 22, 2013

(54) AUTOMATIC GREASE SUPPLY DEVICE OF INJECTION MOLDING MACHINE

(75) Inventors: Masahiko Urata, Yamanashi (JP); Tatsuhiro Uchiyama, Yamanashi (JP); Koichi Nishimura, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 56 days.

(21) Appl. No.: 12/947,481

(22) Filed: Nov. 16, 2010

(65) Prior Publication Data

US 2011/0159132 A1  Jun. 30, 2011

(30) Foreign Application Priority Data

Dec. 25, 2009 (JP) ................................. 2009-294947
Apr. 26, 2010 (JP) ................................. 2010-101276

(51) Int. Cl.
*B29C 45/17* (2006.01)
*B29C 45/64* (2006.01)

(52) U.S. Cl.
USPC .......................................... 425/107; 425/150

(58) Field of Classification Search
USPC ......................................................... 425/107
See application file for complete search history.

(56) References Cited

U.S. PATENT DOCUMENTS

| 5,217,662 | A |   | 6/1993  | Yamamura et al. |         |
|-----------|---|---|---------|-----------------|---------|
| 5,792,395 | A | * | 8/1998  | Ito et al.      | 264/40.1|
| 6,179,597 | B1| * | 1/2001  | Ito et al.      | 425/107 |
| 2008/0271949 | A1 |   | 11/2008 | Tokuyama et al. |       |
| 2009/0167229 | A1 | * | 7/2009  | Brunner et al.  | 318/503|

FOREIGN PATENT DOCUMENTS

| JP | 3079325 A    | 4/1991  |
|----|--------------|---------|
| JP | 4112017 A    | 4/1992  |
| JP | 10156913 A   | 6/1998  |
| JP | 11-270789 A  | 10/1999 |
| JP | 11277600     | 10/1999 |
| JP | 2000-190375 A| 7/2000  |
| JP | 2000190375   | 7/2000  |
| JP | 2002-160279 A| 6/2002  |
| JP | 2008261394 A | 10/2008 |
| JP | 2009023312 A | 2/2009  |
| JP | 2009279891 A | 12/2009 |

OTHER PUBLICATIONS

Japanese Office Action for Application No. 2010101276, mailed Feb. 22, 2011.
A German Office Action dated May 11, 2012 issued in German Application No. 10 2010 052 254.6.
Office Action for Chinese application No. 201010561770.5 dated Jun. 9, 2013.

* cited by examiner

*Primary Examiner* — Ryan Ochylski
(74) *Attorney, Agent, or Firm* — Lowe Hauptman & Ham LLP

(57) ABSTRACT

A lubricant such as grease is supplied by a grease supply device to a grease supply point of an injection molding machine. A workload of a movable portion forming the injection molding machine when the movable portion operates is calculated and a grease supply command is output to the grease supply device when the calculated workload exceeds a reference value. An operating state of the injection molding machine is evaluated by using the workload reflecting a load on the movable portion and, in this way, insufficiency of lubrication of the movable portion is anticipated.

8 Claims, 6 Drawing Sheets

| LOAD L | WEIGHING FACTOR A |
|---|---|
| $0 \leq L < L_1$ | $A(0)$ |
| $L_1 \leq L < L_2$ | $A(1)$ |
| ⋯ | ⋯ |
| $L_{n-1} \leq L < L_n$ | $A(n-1)$ |
| $L_n \leq L$ | $A(n)$ |

| STROKE S | WEIGHING FACTOR B |
|---|---|
| $0 \leq S < S_1$ | $B(0)$ |
| $S_1 \leq S < S_2$ | $B(1)$ |
| ⋯ | ⋯ |
| $S_{m-1} \leq S < S_m$ | $B(m-1)$ |
| $S_m \leq S$ | $B(m)$ |

FIG. 8

| S \ L | $0 \leq L < L_1$ | $L_1 \leq L < L_2$ | ... | $L_{n-1} \leq L < L_n$ | $L_n \leq L$ |
|---|---|---|---|---|---|
| $0 \leq S < S_1$ | C(0, 0) | C(0, 1) | ... | C(0, n−1) | C(0, n) |
| $S_1 \leq S < S_2$ | C(1, 0) | C(1, 1) | ... | C(1, n−1) | C(1, n) |
| ... | ... | ... | ... | ... | ... |
| $S_{m-1} \leq S < S_m$ | C(m−1, 0) | C(m−1, 1) | ... | C(m−1, n−1) | C(m−1, n) |
| $S_m \leq S$ | C(m, 0) | C(m, 1) | ... | C(m, n−1) | C(m, n) |

AUTOMATIC GREASE SUPPLY DEVICE OF INJECTION MOLDING MACHINE

RELATED APPLICATIONS

The present application is based on, and claims priority from, Japanese Application Number 2009-294947 filed Dec. 25, 2009; and Japanese Application Number 2010-101276 filed Apr. 26, 2010, the disclosures of which are hereby incorporated by reference herein in their entirety.

BACKGROUND OF THE INVENTION

1. Field of the Invention

The present invention relates to an automatic grease supply device for supplying a lubricant such as grease in order to prevent wear of sliding surfaces and rotating surfaces of movable portion of an injection molding machine.

2. Description of the Related Art

In the injection molding machine, it is necessary to supply grease at regular or irregular intervals to avoid insufficient lubrication in order to prevent wear of sliding surfaces and rotating surfaces of movable portions such as a ball screw, bearings, and a toggle bushing.

Insufficient supply of grease and insufficiency of lubrication causes mechanical problems, whereas excessive supply of grease causes problems such as adhesion of the grease to a molded article and increase in grease consumption. Because a lubricated state changes due to loads on movable portions, moving speeds of the movable portions, and moving times of the movable portions, a technique for measuring these physical amounts to automatically supply grease so as to supply the grease at the optimum time has been proposed conventionally.

Japanese Patent Application Laid-Open No. 3-793250 discloses a technique for detecting insufficiency of lubrication based on a voltage corresponding to an armature current from a current detector for detecting the armature current of a servomotor for driving a movable portion to supply the grease.

Japanese Patent Application Laid-Open No. 2000-190375 discloses a technique for supplying the grease according to an operating time of an injection molding machine and the total number of cycles and a technique for supplying the grease according to a product of a stroke and the number of cycles.

Japanese Patent Application Laid-Open No. 2008-261394 discloses a technique for obtaining physical amounts related to a movable member and representing values such as largest values and smallest values of the physical amounts and anticipating insufficiency of lubrication based on time-series variation of the representing values to supply the grease.

With the technique disclosed in Japanese Patent Application Laid-Open No. 3-793250 described above, variation in a mechanical resistance (load) due to variation in the lubricated state of the movable portion is kept track of based on the voltage corresponding to the armature current from the current detector for detecting the armature current of the servomotor for driving the movable portion and therefore it is possible to directly keep track of the variation in the lubricated state. However, magnitude of the voltage corresponding to the armature current varies also due to a change in operating conditions such as a change in a molding speed or a mold of the injection molding machine other than lubricated state and it is difficult to know optimum grease supply timing based on error voltage only. This is true in the technique disclosed in Japanese Patent Application Laid-Open No. 2008-261394 described above and it is extremely difficult to determine whether the change in the physical amount is caused by the insufficiency of lubrication or other factors in injection molding in which molding conditions are changed frequently depending on differences in the mold and resin.

In the technique disclosed in Japanese Patent Application Laid-Open No. 2000-190375 described above, the grease supply timing is obtained based on the number of cycles, time, or the product of the stroke and the number of cycles and therefore it is possible to supply the grease according to an actual operating state of the machine. However, the grease is supplied irrespective of magnitude of the load and therefore it is difficult to completely avoid insufficiency of lubrication and excessive lubrication.

SUMMARY OF THE INVENTION

Therefore, it is an object of the present invention to provide an automatic grease supply device of an injection molding machine for anticipating insufficiency of lubrication of a movable portion by evaluating an operating state of the injection molding machine by using a workload reflecting a load on the movable portion and supplying a just enough amount of grease to solve the insufficiency of lubrication of the movable portion to thereby obtain an appropriately lubricated state of the machine.

It is a more concrete object of the invention to provide an automatic grease supply device of an injection molding machine for anticipating insufficiency of lubrication of a movable portion by evaluating an operating state of the injection molding machine by using a workload reflecting a load on the movable portion and supplying grease when the workload of the movable portion exceeds a preset value to thereby obtain an appropriately lubricated state of the machine.

It is another concrete object of the invention to provide an automatic grease supply device of an injection molding machine for anticipating insufficiency of lubrication of a movable portion by evaluating an operating state of the injection molding machine by using a workload reflecting a load for each predetermined time on the movable portion and supplying grease according to the workload of the movable portion to thereby obtain an appropriately lubricated state of the machine.

To achieve the above object, an automatic grease supply device of an injection molding machine according to the present invention, in which a lubricant such as grease is supplied to a grease supply point of the injection molding machine by means of the grease supply device, comprises: workload calculating means for calculating a workload of a movable portion forming the injection molding machine when the movable portion operates; and grease supply command means for outputting a grease supply command to the grease supply device based on the workload calculated by the workload calculating means.

The grease supply command means may compare the workload calculated by the workload calculating means with a reference workload set in advance and output the grease supply command to the grease supply device when the calculated workload exceeds the reference workload.

The automatic grease supply device may further comprise grease supply amount calculating means for obtaining an amount of the grease to be supplied from the workload calculated by the workload calculating means when a first predetermined time has elapsed, wherein the grease supply command means outputs the grease supply command corresponding to the amount of the grease to be supplied that was calculated by the grease supply amount calculating means.

The workload calculating means may obtain the workload by integrating a product of a thrust and a moving distance of a linear motor for driving the movable portion when the motor operates, with respect to operating time of the linear motor.

The workload calculating means may obtain the workload by obtaining electric power of a motor for driving the movable portion and integrating the obtained electric power with respect to operating time of the motor.

The workload calculating means may obtain the workload by multiplying by any one of, or both of, a weighting factor corresponding to an index of a load and a weighting factor corresponding to an index of a stroke, when obtaining the workload.

According to the invention, it is possible to provide an automatic grease supply device of an injection molding machine for anticipating insufficiency of lubrication of a movable portion by evaluating an operating state of the injection molding machine by using the workload reflecting a load on the movable portion and supplying a just enough amount of grease to solve the insufficiency of lubrication of the movable portion to thereby obtain an appropriately lubricated state of the machine.

According to the invention, it is possible to provide an automatic grease supply device of an injection molding machine for anticipating insufficiency of lubrication of a movable portion by evaluating the operating state of the injection molding machine by using the workload reflecting the load on the movable portion and supplying grease when the workload of the movable portion exceeds a preset value to thereby obtain an appropriately lubricated state of the machine.

Furthermore, according to the invention, it is possible to provide an automatic grease supply device of an injection molding machine for anticipating insufficiency of lubrication of a movable portion by evaluating the operating state of the injection molding machine by using the workload reflecting the load for each predetermined time on the movable portion and supplying grease according to the workload of the movable portion to thereby obtain an appropriately lubricated state of the machine.

BRIEF DESCRIPTION OF THE DRAWINGS

FIG. 8 is a drawing for explaining that a weighting factor of a workload is determined according to the index of the load and the index of the stroke.

DETAILED DESCRIPTION OF THE PREFERRED EMBODIMENTS

Figure 1:
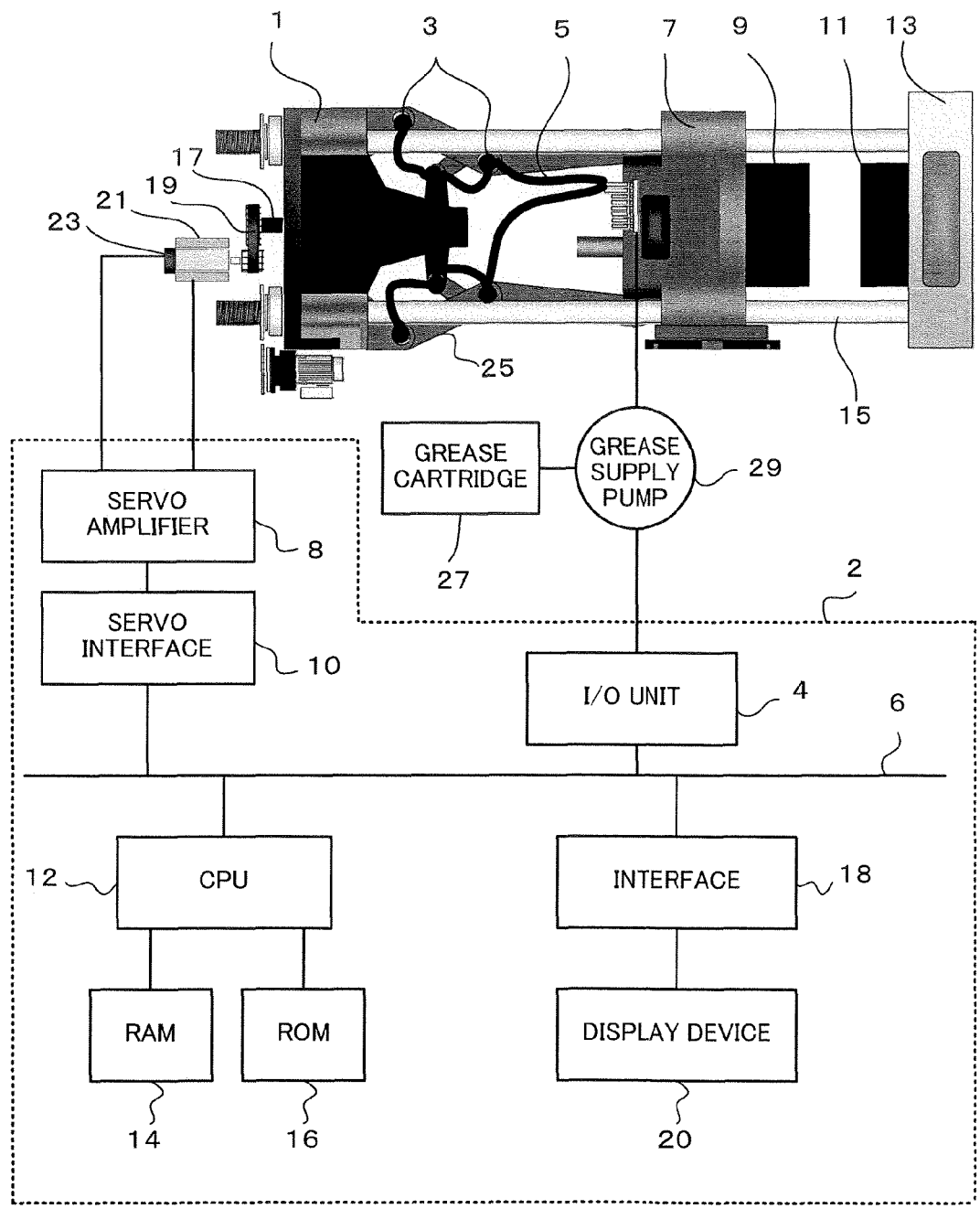
FIG. 1 is a diagrammatic illustration of an example of a mold clamping device in an injection molding machine, in which an embodiment of an automatic grease supply device according to the invention is mounted to the device.

FIG. 1 is a diagrammatic illustration of an example of a mold clamping device in an injection molding machine. The mold clamping device is made up of a mold clamping mechanism, an ejector driving mechanism (not shown), and a mold thickness adjusting mechanism. The mold clamping mechanism opens and closes a mold and can clamp the mold with strong force to prevent the mold from giving in to pressure of resin and opening during injection. A rear platen 1 and a fixed platen 13 are coupled by four tie bars 15 forming the mold clamping mechanism. Between the rear platen 1 and the fixed platen 13, a movable platen 7 is disposed to be movable while guided by the tie bars 15. A fixed side mold 11 is mounted to the fixed platen 13 and a movable side mold 9 is mounted to the movable platen 7 to face the fixed side mold 11.

A toggle mechanism forming the mold clamping mechanism and made up of a toggle link 25 and the like is disposed between the rear platen 1 and the movable platen 7 and a nut provided to a crosshead of the toggle mechanism is fitted by screwing over a ball screw 17 mounted to the rear platen 1 to be rotatable but axially immovable. The mold clamping servomotor 21 drives the ball screw 17 through a transmission mechanism 19 to thereby move the movable platen 7 toward or away from the fixed platen 13 to close or open the molds 9 and 11 to thereby form a toggle-type mold clamping device.

A mold closing operation is an operation for moving the movable platen 7 forward toward the fixed platen 13. A mold opening operation is an operation for moving the movable platen 7 rearward away from the fixed platen 13. To the mold clamping servomotor 21, a position detector 23 for detecting a rotational position (rotational angle) of the mold clamping servomotor 21 is attached. A current detector (not shown) for detecting an electric current passing through the mold clamping servomotor 21 is attached to a mold clamping servo amplifier 8 and the detected electric current detected by the current detector is fed back to a controller 2 through a servo interface 10. The controller 2 can obtain a torque value of the clamping servomotor 21 based on the fed-back detected electric current.

To the mold clamping device, a grease supply pipe 5 for supplying grease for lubrication to grease supply points 3 such as a support shaft portion of the toggle link 25 that moves when the mold clamping servomotor 21 is driven is connected as shown in FIG. 1. A grease supply pump 29 sends the grease for lubrication and stored in a grease cartridge 27 to the respective grease supply points 3 through the grease supply pipe 5 under control of the controller 2. The grease supply pump 29 supplies a predetermined amount of the lubricant such as the grease to the respective grease supply points 3, outputs a grease end signal, and stops automatically.

The grease supply device is made up of the controller 2, the grease supply pipe 5, the grease supply pump 29, and the like. The grease supply devices are of a type that supplies a constant amount of grease by one actuation and a type that variably controls an amount of grease to be supplied by adjusting an actuation time by using a timer.

If the type of grease supply device that supplies a certain amount of grease by one actuation of the grease supply device is used, it is common practice to set an amount of grease to be supplied before factory shipment of the injection molding machine having the grease supply device. On the other hand, in the case of a grease supply device that can variably control an amount of grease to be supplied by adjusting the actuation time, it is common practice to set an actuation time in a timer for which the grease supply device is actuated to adapt to the amount of grease to be supplied before or after factory shipment.

Amounts of lubricant such as grease to be supplied to the respective grease supply points 3 are adjusted appropriately by a valve in a flow divider (not shown) or based on a thickness of the grease supply pipe 5.

The controller 2 is a device for controlling the injection molding machine and FIG. 1 only shows an essential portion of the controller 2. To a processor (CPU) 12 for controlling the entire injection molding machine, the servo interface 10 for controlling a position, speed, and an electric current (torque) of the mold clamping servomotor 21, an I/O unit 4 for controlling the grease supply pump 29, and an interface 18 for controlling a display device 20 such as a liquid crystal display device are connected through a bus 6. The controller 2 has a timer function and a calendar function similarly to the prior art. Because the controller has the calendar function, it can measure an operating time from time of the last operation to time at which the injection molding machine is to be operated this time, using the calendar function, even when the injection molding machine is not operating.

The servo interface 10 is made up of a processor, a memory, an interface, and the like. To this servo interface 10, a position feedback signal from the position detector 23 attached to the mold clamping servomotor 21 is input. To the servo interface 10, the mold clamping servomotor 21 is connected through the servo amplifier 8.

Next, timing for sending the lubricant such as grease stored in the grease cartridge 27 out to the grease supply points 3 will be described.

Focusing on a fact that a lubricated state of a movable portion of an injection molding machine varies due to a load on the movable portion, moving speed of the movable portion, and an operating time, a "workload" of the movable portion is obtained from these parameters and the overall lubricated state is monitored based on the obtained workload. Furthermore, by supplying the grease when the workload exceeds a predetermined value (hereafter referred to as "reference workload"), the grease can be supplied at the optimum time according to a change in molding conditions and magnitude of the load, troubles of the movable portion and excessive supply of the grease can be prevented, and preferable operating state can be maintained.

Next, a method of obtaining the workload $U_M$ when the movable portion is driven by a motor will be described. The workload $U_{MR}$ when the movable portion is a rotary motor can be obtained by the following expression (1).

$$U_{MR}=\Sigma(T\cdot\Delta\theta) \quad (1)$$

Here, T is torque of the rotary motor, $\Delta\theta$ is a difference between rotational angles of the rotary motor at predetermined time intervals, and $\Sigma$ is an integral with respect to operating time of the rotary motor.

On the other hand, the workload $U_{ML}$ when the movable portion is driven by a linear motor can be obtained by the following expression (2).

$$U_{ML}=\Sigma(F\cdot\Delta X) \quad (2)$$

Here, F is thrust of the linear motor, $\Delta X$ is a moving distance of the linear motor for each predetermined time period, and $\Sigma$ is an integral with respect to operating time of the linear motor.

Instead of obtaining the workload of a motor by the expression (1) or (2), electric power required to drive the motor can be measured by using an electric energy meter or the like and electric energy obtained by integrating the measured electric power with respect to operating time of the motor can be obtained as the "workload" $U_M$ ($U_{MR}$ or $U_{ML}$).

First Embodiment for Monitoring Workload

Figure 2:
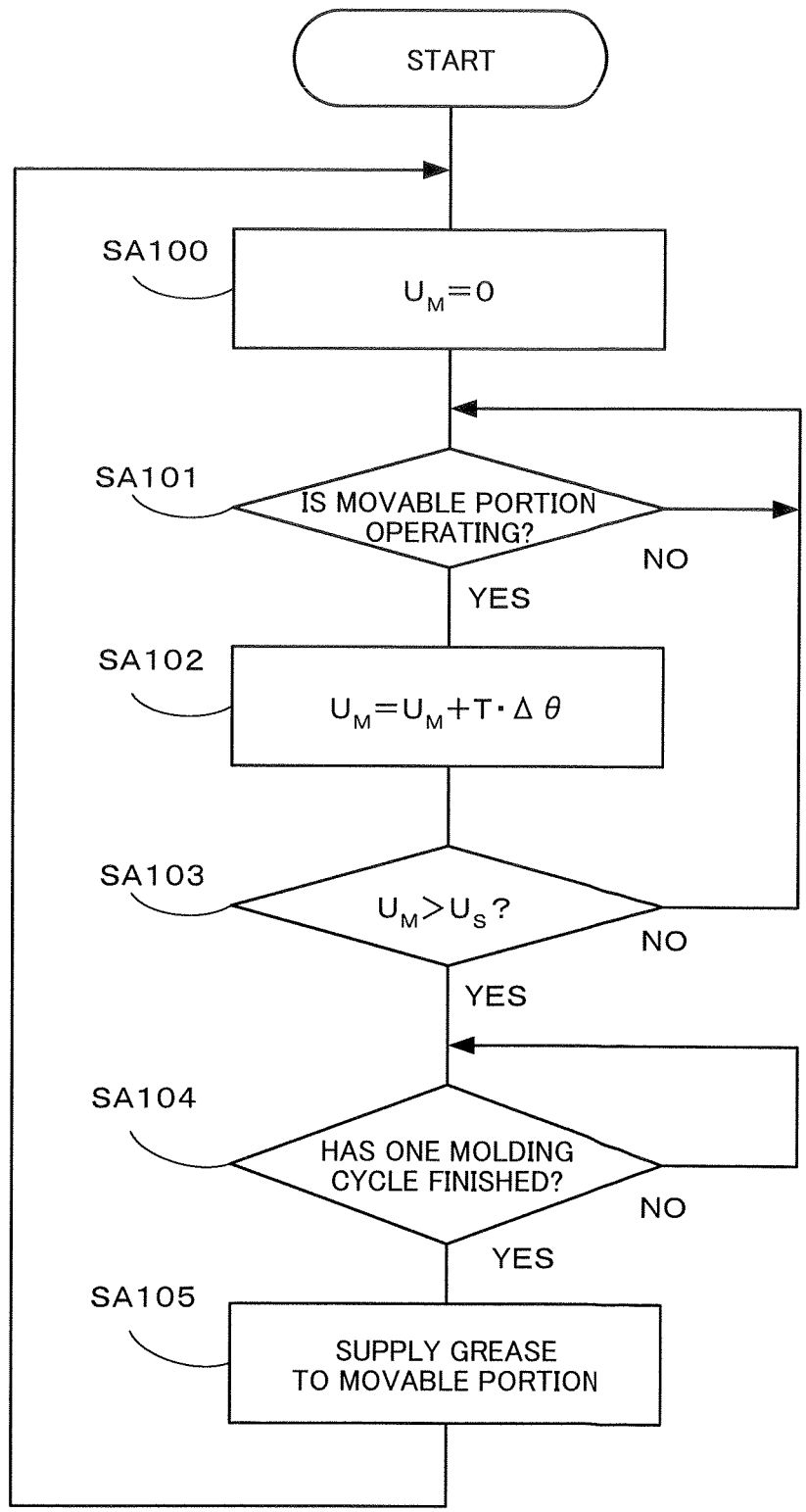
FIG. 2 is a flowchart showing an algorithm of processing for supplying grease to a movable portion of the injection molding machine by using a type of grease supply device that supplies a constant amount of grease by one actuation.

FIG. 2 is a flowchart showing an algorithm of processing for supplying grease to a movable portion of an injection molding machine by using a type of grease supply device that supplies a constant amount of grease by one actuation. Respective steps will be described below. In this flowchart, supply of grease to a movable portion driven by a rotary motor is taken as an example.

[Step SA100] A value of the workload $U_M$ is initialized ($U_M=0$).

[Step SA101] Whether the movable portion is in operation or not is determined. If it is in operation, the algorithm proceeds to step SA102. If it is not in operation, the algorithm proceeds to step SA102 after the operation starts.

[Step SA102] The workload $U_M$ is updated by obtaining the torque T of the motor and the difference $\Delta\theta$ of the rotational angles of the motor in a current control cycle and adding $T\cdot\Delta\theta$ to the workload $U_M$ obtained in the last control cycle. In other words, $U_M=U_M+T\cdot\Delta\theta$ is calculated.

[Step SA103] Whether or not the workload $U_M$ calculated in step SA102 is greater than the reference workload $U_S$ is determined. If it is greater ($U_M>U_S$), the algorithm proceeds to step SA104. If it is not greater ($U_M\leq U_S$), the algorithm returns to step SA101.

[Step SA104] Whether one molding cycle has finished or not is determined and the algorithm proceeds to step SA105 after the one molding cycle finishes.

[Step SA105] The grease is supplied to the movable portion and the algorithm returns to step SA100 to continue the processing.

The reference workload $U_S$ can be obtained by actually bringing the injection molding machine into operation and studying a relationship between the workload and the lubricated state, for example. The reference workload $U_S$ can also be obtained by calculation based on the specification (sizes of the ball screw and bearings, and the like) of mechanism portions to be supplied with the grease or the reference workload $U_S$ can also be obtained by simulation or the like.

It is common practice to store the reference workload $U_S$ obtained in this manner in a nonvolatile storage device of the injection molding machine. The nonvolatile storage device in which the reference workload $U_S$ is stored may be rewritable or may be nonrewritable. Whether rewritable nonvolatile storage device is used or nonrewritable nonvolatile storage device is used, it is common practice to store the reference workload in the nonvolatile storage device before the factory shipment. If the rewritable nonvolatile storage device is used, a serviceman or the like may rewrite the reference workload $U_S$ or the injection molding machine itself may rewrite the reference workload $U_S$ after the factory shipment.

To get a rough idea, an amount of lubricant such as grease to be supplied to a movable portion of an injection molding machine may be such an amount as allowing most of the grease to be replaced by one supply of the grease or may be such an amount as allowing most of the grease to be replaced by multiple supplies of the grease. For example, if an amount of grease to be supplied is roughly an amount which allows most of the grease to be replaced by two supplies of the grease (or if the number of supplies of the grease required to replace most of the grease is two), the amount of grease to be supplied is about half of the amount of grease to be supplied which allows most of the grease to be replaced by one supply of the grease.

The reference workload $U_S$ when the amount of grease to be supplied is roughly the amount which allows most of the grease to be replaced by one supply of the grease is different from the reference workload $U_S$ when the amount of grease to be supplied is roughly the amount which allows most of the grease to be replaced by two supplies of the grease. Grease supply intervals when the amount of grease to be supplied is roughly the amount which allows most of the grease to be replaced by two supplies of the grease are shorter than grease supply intervals when the amount of grease to be supplied is roughly the amount which allows most of the grease to be replaced by one supply of the grease, the reference workload $U_S$ when the amount of grease to be supplied is roughly the amount which allows most of the grease to be replaced by two supplies of the grease is smaller than the reference workload $U_S$ when the amount of grease to be supplied is roughly the amount which allows most of the grease to be replaced by one supply of the grease.

In the processing in the above-described flowchart in FIG. 2, the grease is supplied every time the workload $U_M$ reaches the reference workload $U_S$. In other words, the same amount of grease can be supplied every time, because the grease is supplied when the state of insufficiency of lubrication reaches substantially the same level.

Figure 3:
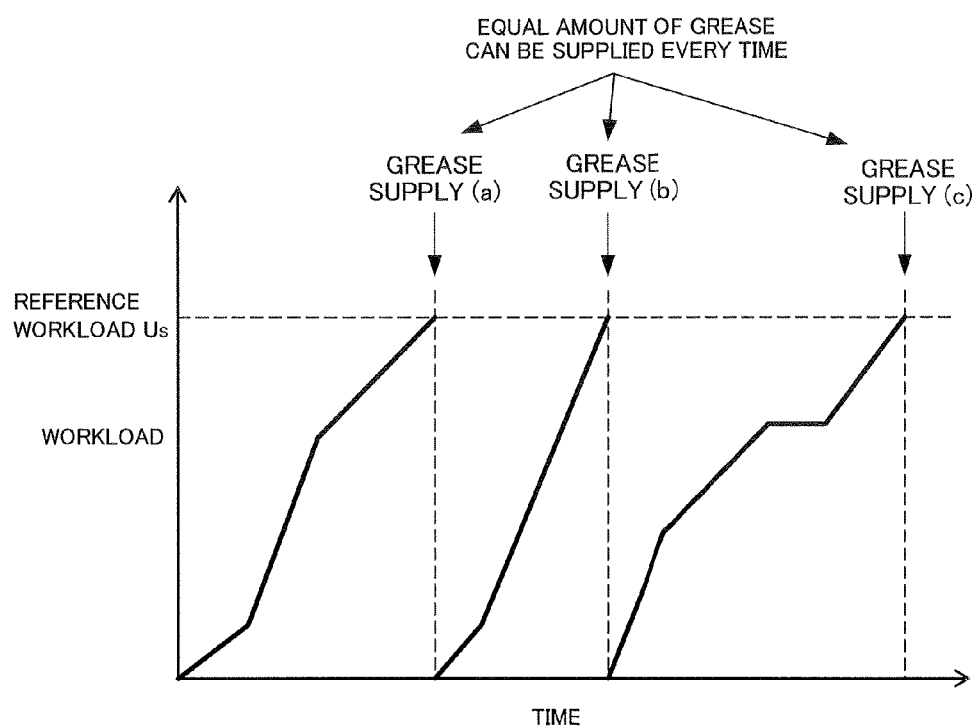
FIG. 3 is a drawing for explaining supply of the grease when the processing shown in the flowchart in FIG. 2 is performed by using the type of grease supply device that supplies a constant amount of grease by one actuation.

FIG. 3 is a drawing for explaining supply of the grease by using the type of grease supply device that supplies a constant amount of grease by one actuation, in which a horizontal axis represents time and a vertical axis represents a workload.

When the processing in the flowchart shown in FIG. 2 is performed, the grease is supplied as shown in FIG. 3. If the grease is supplied, the workload is reset to zero and calculation of the workload starts again. Then, when the calculated workload reaches the reference workload $U_S$, the grease is supplied. The amounts of grease supplied to the movable portion of the injection molding machine by the grease supply device are the same in grease supply (a), grease supply (b), and grease supply (c).

In the first embodiment of the invention described above, as described by using FIGS. 2 and 3, the grease is supplied every time the workload reaches the reference workload $U_S$. Because the workload is an index of a state of insufficiency of the lubrication, it is also possible to supply the grease based on a workload for every predetermined time.

An embodiment of the invention of the supply of the grease based on the workload for every predetermined time will be described as a second embodiment for monitoring the workload.

Second Embodiment for Monitoring Workload

For example, if the workload of a movable portion for a certain time period, e.g., 24 hours, one week, and one month, is monitored, the workload can be used as an index of the state of insufficiency of lubrication during the monitored time period. For example, when the workload of the movable portion during the monitored time period is greater than a standard workload, it is presumed that the lubrication is insufficient. Therefore, in the embodiment, the amount of grease corresponding to the state of insufficiency of the lubrication is supplied.

In order to supply the amount of grease according to the state of insufficiency of the lubrication, a workload (index of the state of insufficiency of the lubrication) of the movable portion until a "first predetermined time" elapses is calculated, the amount of grease to be supplied (grease supply amount) is obtained from the calculated workload (index of the state of insufficiency of the lubrication), and the obtained amount of grease is supplied to carry out the grease supply. In this case, as the grease supply device, it is possible to use a device in which an amount of grease to be supplied when the grease supply device is actuated can be variably controlled by using a timer or the like.

If the device in which the amount of grease to be supplied can be controlled by using the timer is used, the amount of grease to be supplied can be obtained by the following expression (3). The amount of grease to be supplied is obtained by multiplying the workload until the "first predetermined time" elapses by a factor α, and an actuation time of the grease supply device is obtained by further multiplying the obtained amount of grease to be supplied by a factor β.

$$\text{Actuation time of grease supply device} = \alpha \cdot \beta \cdot U_M \quad (3)$$

Here, β is a factor for obtaining the amount of grease to be supplied ($\beta \cdot U_M$) from the workload $U_M$ and α is a factor for obtaining the actuation time of the grease supply device from the amount of grease to be supplied ($\beta \cdot U_M$).

The actuation time of the grease supply device obtained by the above expression (3) is set in the timer of the grease supply device and the grease supply device is actuated. In the manner described above, it is possible to supply the amount of grease according to the state of insufficiency of lubrication at time intervals of the "first predetermined time".

Figure 4:
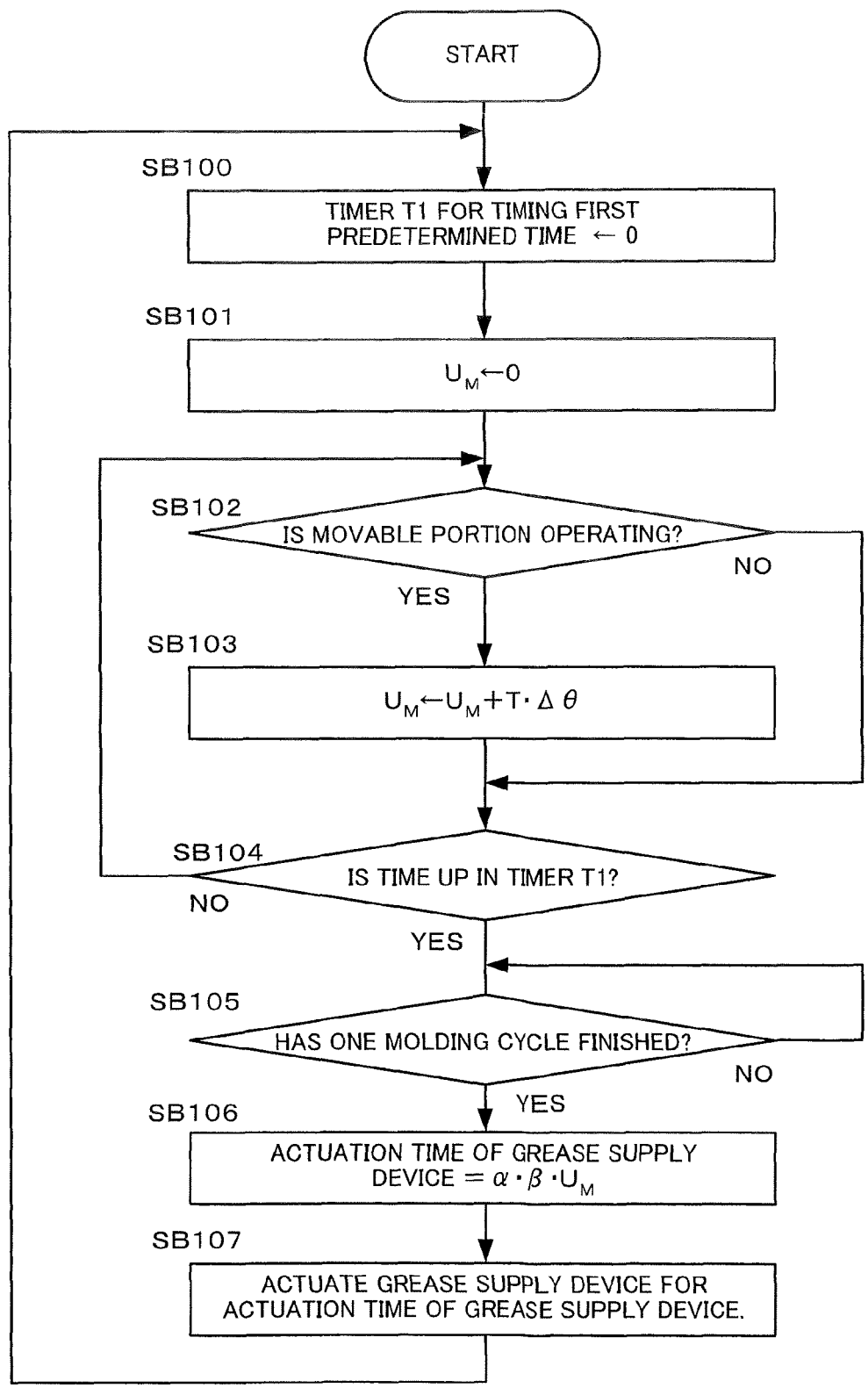
FIG. 4 is a flowchart showing an algorithm of processing for obtaining an amount of grease to be supplied, at regular intervals, based on a workload and supplying the obtained amount of grease to the movable portion.

FIG. 4 is a flowchart showing an algorithm of processing for obtaining an amount of grease to be supplied at regular intervals from the workload to supply the obtained amount of grease to a movable portion.

[Step SB100] The timer T1 for timing a first predetermined time is initialized to zero.

[Step SB101] A value of the workload $U_M$ is initialized ($U_M=0$).

[Step SB102] Whether the movable portion is in operation or not is determined. If it is in operation, the algorithm proceeds to step SB103. If it is not during operation, the algorithm proceeds to step SB104.

[Step SB103] The workload $U_M$ is updated by obtaining the torque T of the motor and the difference Δθ between the rotational angles of the motor in a current control cycle and adding T·Δθ to the workload $U_M$ obtained in the last control cycle. In other words, $U_M=U_M+T\cdot\Delta\theta$ is calculated.

[Step SB104] Whether or not the timer T1 has finished timing of the predetermined time is determined. If the timing of the predetermined time has been finished, the algorithm proceeds to step SB105. If the timing of the predetermined time has not been finished, the algorithm proceeds to step SB102.

[Step SB105] Whether or not one molding cycle has finished is determined. If the molding cycle has finished, the algorithm proceeds to step SB106. If the molding cycle has not finished, the algorithm waits for the one molding cycle to finish.

[Step SB106] The actuation time of the grease supply device is obtained by calculating $\alpha \cdot \beta \cdot U_M$ by using the expression (3). Here, β is a factor for obtaining the amount of grease to be supplied ($\beta \cdot U_M$) from the workload $U_M$ and α is a factor for obtaining the actuation time of the grease supply device from the obtained amount of grease to be supplied ($\beta \cdot U_M$).

[Step SB107] The grease supply device is actuated for the actuation time obtained in step SB106 and the algorithm returns to step SB100.

Figures 5, 6, 7:
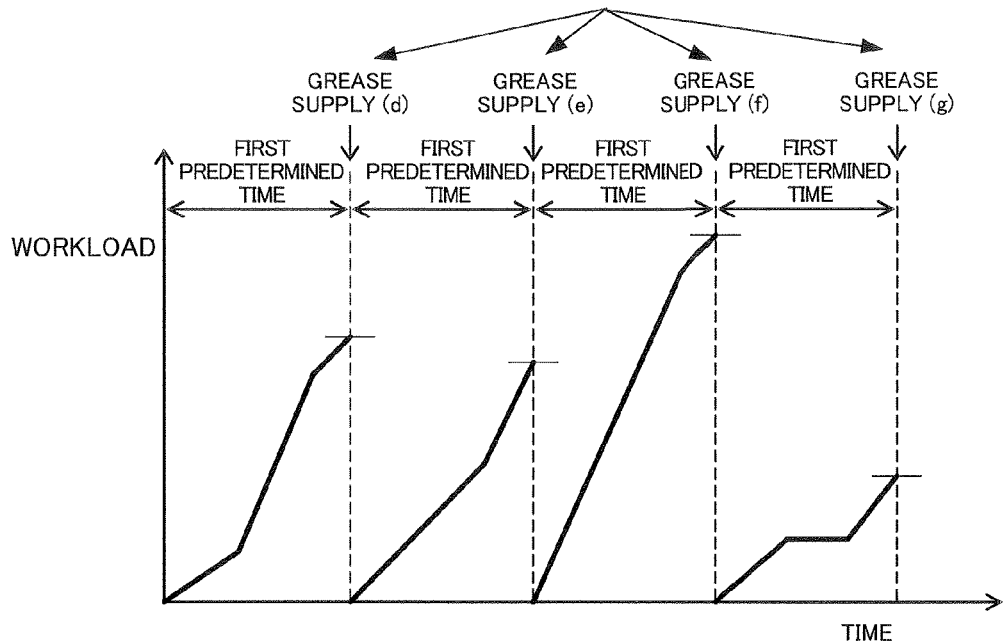
FIG. 5 is a drawing for explaining the supply of the grease when the processing shown in the flowchart in FIG. 4 is performed by using a type of grease supply device that can variably control an amount of grease to be supplied by adjusting an actuation time.
FIG. 6 is a drawing for explaining that a weighting factor A according to an index of a load is determined according to magnitude of the index of the load.
FIG. 7 is a drawing for explaining that a weighting factor according to an index of a stroke is determined according to magnitude of the index of the stroke.

FIG. 5 is a drawing for explaining that the amount of grease to be supplied is obtained at regular intervals from the workload and that the obtained amount of grease is supplied. A horizontal axis represents time and a vertical axis represents the workload. FIG. 5 explains that the amount of grease to be supplied is obtained from the workload at the time of the supply of the grease and that the obtained amount of grease is supplied.

When the processing in the flowchart shown in FIG. 4 is performed by using the type of grease supply device that can variably control the amount of grease to be supplied by adjusting the actuation time, the grease is supplied as shown in FIG. 5. As it can be seen from the flowchart in FIG. 4, when the grease is supplied, the timer T1 for timing the first predetermined time is reset to zero and timing is started again. Then, when the timer T1 has timed the first predetermined time, the grease is supplied. The grease supply device calculates the workload for the first predetermined time at the time of each of a grease supply (d), a grease supply (e), a grease supply (f), and a grease supply (g), the amount of grease to be supplied is obtained from the calculated workload, and the obtained amount of grease to be supplied is supplied to a movable portion of an injection molding machine.

(Method of Obtaining the First Predetermined Time and Storing it in Storage Device)

Next, a method of obtaining the first predetermined time used in the processing in the flowchart in FIG. 4 and storing the obtained time in the storage device will be described. For example, the injection molding machine is actually brought into operation to study the relationship between the workload and the lubricated state, an operating time which would cause insufficient lubrication is obtained, and a time shorter than the operating time which would cause insufficient lubrication can be employed as a first predetermined time. Similarly to the reference workload $U_S$, the first predetermined time can also be obtained by calculation from the specification of the mechanism portions of the object to be lubricated and the specification of the grease. Alternatively, the first predetermined time can be obtained by simulation or the like.

It is common practice to store the first predetermined time obtained in this manner in a nonvolatile storage device of an injection molding machine similarly to the reference workload $U_S$ and the nonvolatile storage device may be rewritable or may be nonrewritable.

Factor α for obtaining the actuation time of the grease supply device from the amount of grease to be supplied can be determined by actually actuating the grease supply device to obtain a relationship between a grease supplying time and the amount of grease to be supplied or can be obtained from the specification of the grease supply device. On the other hand, factor β for obtaining an amount of grease to be supplied from the workload can be obtained by actually bringing the injection molding machine into operation and studying the relationship between the workload $U_M$ and the lubricated state similarly to the reference workload, can be obtained from the specification of mechanism portions to be supplied with grease or the specification of the grease, or can also be obtained by simulation or the like.

It is common practice to store the factor α for obtaining an actuation time of the grease supply device from an amount of grease to be supplied and the factor β for obtaining an amount of grease to be supplied from the workload $U_M$ in the nonvolatile storage device of the injection molding machine similarly to the above description and the nonvolatile storage device may be rewritable or may be nonrewritable.

As described above, there are two types of supply of grease based on the workload $U_M$, i.e., the first embodiment in which grease is supplied every time the workload $U_M$ reaches the reference workload $U_S$ and the second embodiment in which an amount of grease corresponding to the workload for each predetermined time is supplied. In each of the embodiments, the amount of grease corresponding to the workload $U_M$ is supplied and the amount of grease according to the state of insufficiency of the lubrication can be supplied.

Although it is common practice to set a time, as the first predetermined time, shorter than an operating time which would cause insufficient lubrication, as described above, it is possible that lubrication becomes insufficient within a time shorter than the first predetermined time when the machine operates continuously under a heavy load, for example. Therefore, the grease may be supplied when the workload $U_M$ reaches a value corresponding to the reference workload $U_S$ before the first predetermined time elapses. At this time, the amount of grease to be supplied can be obtained from the workload $U_M$ similarly to the above case.

(Converted Workload)

There may be a difference in likelihood of insufficiency of lubrication between a case in which the load is heavy and the moving distance is short and a case in which the load is light and the moving distance is long, when the workload $U_M$ is the same in both the cases. In order to correct the difference, it is possible to introduce a correction factor (weighting factor) according to an index L of the load and a correction factor (weighting factor) according to an index S of the stroke. The weighting factor according to the index L of the load and the weighting factor according to the index S of the stroke are factors by which the workload is multiplied when the workload is obtained. The workload multiplied by the weighting factor will be hereafter referred to as converted workload.

The index L of the load is an index of the magnitude of the load applied to an injection mechanism or a mold clamping mechanism. The index L is a detection value of peak pressure at the time of injection, for example, in the case of the mold clamping mechanism and is a set value or a detection value of mold clamping force or a set value or a detection value of a mold touch position, for example. The index S of the stroke is an injection stroke (a set value of a metering completion position or a detection value of an injection start position), for example, in a case of the injection mechanism and is a mold opening/closing stroke (a set value of a mold opening completion position), for example, in the case of the mold clamping mechanism.

(Weighting Factor corresponding to the Index of the Load)

The weighting factor A corresponding to the index of the load is determined according to the magnitude of the index L of the load as shown in FIG. 6, for example. FIG. 6 is a drawing for explaining that the weighting factor A corresponding to the index of the load is determined according to the magnitude of the index of the load.

If the detection value of peak pressure at the time of injection is employed as the index L of the load, the weighting factor corresponding to the index of the load is set to A(0) if the detection value L of the peak pressure at the time of injection is $0 \leq L < L_1$ and the weighting factor corresponding to the index of the load is set to A(1) if the detection value L of the peak pressure at the time of injection is $L_1 \leq L < L_2$, for example.

When obtaining the workload, the workload is multiplied by the weighting factor A corresponding to the index L of the load. For example, if the detection value of peak pressure at the time of injection is employed as the index L of the load, the weighting factor A corresponding to the index L of the load is $A=A(1)$ when the detection value L of the peak pressure at the time of injection is $L_1 \leq L < L_2$ and therefore the converted workload is obtained by the following expression (4).

$$\text{Converted workload} = \Sigma A(1) \cdot T \cdot \Delta\theta \tag{4}$$

It is possible to adjust grease supply intervals with this weighting factor. For example, in an injection molding machine with maximum injection pressure of 200 MPa in specifications, the weighting factor A is set as follows:

Weighting factor A is set to 0.9 in case where the detection value of the peak pressure at the time of injection is smaller than 100 Mpa;

Weighting factor A is set to 1.0 in case where the detection value of the peak pressure at the time of injection is 100 MPa or greater and smaller than 160 Mpa;

Weighting factor A is set to 1.1 in case where the detection value of the peak pressure at the time of injection is 160 MPa or greater.

Under these setting conditions, if molding is carried out under the peak pressure at the time of injection lower than 100 MPa, the weighting factor A in this case is 0.9 and therefore the converted workload is 0.9 times a theoretical value. In other words, when the molding is carried out under the peak pressure at the time of injection lower than 100 MPa, time taken for the converted workload to reach the reference workload lengthens to $(1/0.9) \approx 1.1$ times as compared with a case (a standard state) in which molding is carried out under the peak pressure at the time of injection between 100 to 160 MPa.

On the other hand, when the molding is carried out under the peak pressure at the time of injection higher than or equal to 160 MPa, the weighting factor A in this case is 1.1 and therefore the converted workload is 1.1 times the theoretical value. In other words, when the molding is carried out under the peak pressure at the time of injection higher than or equal to 160 MPa, time required for the converted workload to reach the reference workload shortens to $(1/1.1) \approx 0.9$ times as compared with a case (the standard state) in which molding is carried out under the peak pressure at the time of injection between 100 to 160 MPa.

In this example, because the lubrication is likely to become insufficient when the detection value of the peak pressure at the time of injection becomes 160 MPa or greater even if the workload is the same, the weighting factor is set to 1.1 to shorten the grease supply interval when the detection value of the peak pressure at the time of injection becomes 160 MPa or greater.

(Update of the Weighting Factor A(n) Corresponding to the Index L of the Load)

In the above example, the weighting factor can be updated when the grease is supplied. In other words, the weighting factor is updated based on the detection value of the peak pressure at the time of injection when the grease is supplied and the converted workload can be obtained by using the updated weighting factor until the grease is supplied next time.

It is also possible to update the weighting factor while integrating the converted workload. In other words, if the detection value of the peak pressure at the time of injection changes due to a change in the molding conditions or the like, it is possible to update the weighting factor while executing integration for obtaining the converted workload. For example, while executing integration for obtaining the converted workload with the detection value of the peak pressure at the time of injection being 180 MPa and with the weighting factor of 1.1, if the detection value of the peak pressure at the time of injection changes to 50 MPa due to a change in the molding conditions or the like, then it is possible, since then, to continue integration for obtaining the converted workload with the weighting factor updated to 0.9. In this case, the weighting factor may be updated for every shot, for every predetermined number of shots (e.g., for every 100 shots, for every 1000 shots, or the like), or at a regular time intervals (e.g., at intervals of an hour, 24 hours, and the like).

(Weighting Factor Corresponding to an Index of Stroke)

A weighting factor B according to an index S of stroke is determined according to magnitude of the index S of the stroke as shown in FIG. 7. FIG. 7 is a drawing for explaining that the weighting factor B corresponding to the index of the stroke is determined according to the magnitude of the index of the stroke.

If a set value of a metering completion position is employed as the index S of the stroke, the weighting factor corresponding to the index S of the stroke is set to $B(0)$ when the set value S of the metering completion position is $0 \leq S < S_1$ and the weighting factor corresponding to the index of the stroke is set to $B(1)$ when the set value S of the metering completion position is $S_1 \leq S < S_2$. When obtaining the workload, the workload is multiplied by the weighting factor B corresponding to the index of the stroke.

If the set value of the metering completion position is employed as the index S of the stroke, the weighting factor is set to $B(1)$ according to the index of the stroke when the set value S of the metering completion position is $S_1 \leq S < S_2$ and therefore the converted workload is obtained by the following expression (5).

$$\text{Converted workload} = \Sigma B(1) \cdot T \cdot \Delta\theta \tag{5}$$

It is possible to adjust the grease supply intervals with this weighting factor. For example, in an injection molding machine with a maximum value of metering completion position of 100 mm in the specification, the weighting factor B is set as follows:

weighting factor B is set to 0.9 in case where the set value of the metering completion position is smaller than 50 mm;

weighting factor B is set to 1.0 in case where the set value of the metering completion position is 50 mm or greater and smaller than 80 mm;

weighting factor B is set to 1.1 in case where the set value of the metering completion position is 80 mm or greater.

Under this setting condition, if molding is carried out under the set value of the metering completion position smaller than 50 mm, the weighting factor in this case is 0.9 and therefore the converted workload is 0.9 times a theoretical value. In other words, when the molding is carried out with the set value of the metering completion position smaller than 50 mm, the grease supply interval lengthens to $(1/0.9) \approx 1.1$ times as compared with a case (a standard state) in which molding is carried out with the set value of the metering completion position of 50 mm to 80 mm.

On the other hand, when molding is carried out with the set value of the metering completion position greater than or equal to 80 mm, the weighting factor in this case is 1.1 and therefore the converted workload is 1.1 times the theoretical value. In other words, when the molding is carried out with the set value of the metering completion position greater than or equal to 80 mm, the grease supply interval shortens to $(1/1.1) \approx 0.9$ times as compared with a case (a standard state) in which molding is carried out with the set value of the metering completion position of 50 mm to 80 mm.

An aspect of updating the weighting factor corresponding to the index of the stroke is similar to that of the weighting factor corresponding to the index of the load.

(Combined Use of the Weighting Factor Corresponding to the Index of the Load and the Weighting Factor Corresponding to the Index of Stroke)

The workload may be obtained by using both of the weighting factor A corresponding to the index of the load and the weighting factor B corresponding to the index of the stroke.

When the detection value L of the peak pressure at the time of injection as the index of the load is $L_1 \leq L < L_2$ and the set value S of the metering completion position as the index S of the stroke is $S_1 \leq S < S_2$, the weighting factor corresponding to the index of the load is $A(1)$ and the weighting factor corresponding to the index of the stroke is $B(1)$ and therefore a conversion factor can be obtained by the following expression (6) by using both the weighting factors.

$$\text{Converted workload} = \Sigma A(1) \cdot B(1) \cdot T \cdot \Delta\theta \quad (6)$$

(The Weighting Factor Corresponding to the Index of the Load and the Index of the Stroke)

FIG. 8 is a drawing for explaining that a weighting factor C of a workload is determined according to the index of the load and the index of the stroke.

Similarly to the above description, if the detection value of the peak pressure at the time of injection is employed as the index L of the load and the set value of the metering completion position is employed as the index S of the stroke, the weighting factor C of the workload is $C(1, 1)$ when the detection value L of the peak pressure at the time of injection is $L_1 \leq L < L_2$ and the set value S of the metering completion position is $S_1 \leq S < S_2$.

In this case, the converted workload is obtained by multiplying by the weighting factor $C(1, 1)$ by the following expression (7).

$$\text{Converted workload} = \Sigma C(1,1) \cdot T \cdot \Delta\theta \quad (7)$$

(Method of Obtaining the Weighting Factor and Storage of the Factor)

Weighting factors such as the weighting factor corresponding to the index of the load and the weighting factor corresponding to the index of the stroke can also be obtained by actually bringing the injection molding machine into operation and studying the relationship between the workload and the lubricated state similarly to the reference workload or can also be obtained by calculation, simulation, or the like.

It is common practice to store the weighting factor obtained in this manner in the nonvolatile storage device of the injection molding machine similarly to the reference workload and the nonvolatile storage device may be rewritable or may be nonrewritable.

Although the weighting factor corresponding to the index L of the load and the weighting factor corresponding to the index S of the stroke have been described as weighting factors in obtaining the workload, it is also possible to use a weighting factor corresponding to an index of speed (set values of injection speed or mold opening/closing speed) or a weighting factor corresponding to an index of acceleration (set values or detection values of injection acceleration and mold opening/closing acceleration). For example, a weighting factor with which the grease supply interval shortens can be used when the speed is fast and a weighting factor with which the grease supply interval shortens can be used when the acceleration is high.

The method of obtaining the converted workload can be applied to the calculation of the workload in the process shown in the flowchart in FIG. 2 or FIG. 4.

<Combined Use of Elapsed Time>

In addition to the monitoring of the workload described above, the lubricated state may be monitored by monitoring elapsed time since the last supply of the grease.

In the above embodiments, integration of the workload $U_M$ is not executed when the injection molding machine is not operating. When the injection molding machine is not operated for a long time, a long time elapses without the workload $U_M$ reaching the reference workload $U_S$. Elapse of prolonged time with the workload $U_M$ not reaching the reference workload $U_S$ suggests elapse of prolonged time with no grease supplied.

Because lubricating performance of the grease deteriorates over time even if the injection molding machine to be supplied with the grease is not operating, the lubrication may become insufficient even if the workload $U_M$ has not reached the reference workload $U_S$ after the long time has passed without the supply of grease.

Therefore, in addition to the monitoring of the workload $U_M$, it is possible to also monitor an elapsed time since the last supply of grease.

Example 1 of Combined Use of the Elapsed Time

Not only the workload $U_M$ but also the elapsed time since the last supply of the grease may be monitored and the grease may be supplied when the elapsed time since the last supply of the grease reaches a "second predetermined time" even if the workload $U_M$ has not reached the reference workload $U_S$.

The "second predetermined time" can be determined mainly from a state of deterioration of the lubricating performance of the grease and the state of the deterioration of the lubricating performance of the grease can be obtained by experiments or from the specification of the grease. For example, if it is found by experiments or the like that a total amount of grease should be replaced after a year has elapsed even if the machine has not been operated, the second predetermined time can be set to a year if the amount of grease to be supplied is the amount which allows most of the grease to be replaced by one supply of the grease and the second predetermined time can be set to six months if the amount of grease to be supplied is the amount which allows most of the grease to be replaced by two supplies of the grease.

It is common practice to store the second predetermined time in the nonvolatile storage device of the injection molding machine similarly to the reference workload $U_S$ and the nonvolatile storage device may be rewritable or may be nonrewritable.

Example 2 of Combined Use of the Elapsed Time

An element of the elapsed time since the last supply of the grease may be added to the workload $U_M$. In other words, in comparing the workload $U_M$ and the reference workload $U_S$ with each other, it is possible to compare the workload $U_M$ to which the element of the elapsed time is added with the reference workload $U_S$. The element of the elapsed time can be expressed as $E \cdot D$, if the elapsed time since the last supply of the grease is D and an elapsed time factor is E. By using this, whether $(U_M + E \cdot D) > U_S$ may be determined in step SA103 in FIG. 2.

$(U_M + E \cdot D)$ and $U_S$ are compared with each other in step SA103 in FIG. 2 in order to cope with the deterioration of the lubricating performance of the grease over time, whether the injection molding machine is operating or not after the last supply of the grease.

The elapsed time factor E can be obtained by $E=U_S/D$. In this case, if the reference workload $U_S$ is a basis of replacement of the total amount of the grease by one supply of the grease, it is possible to set D to a time interval at which the total amount of grease is preferably replaced to obtain the elapsed time factor E.

The invention claimed is:

1. An automatic grease supply device of an injection molding machine for supplying grease to a grease supply point of the injection molding machine, the automatic grease supply device comprising:
   a workload calculating unit configured to calculate a workload of a movable portion of the injection molding machine based on a parameter measured during operation of the movable portion; and
   a grease supply command unit configured to
      compare the calculated workload with a reference workload set in advance, and
      output a grease supply command for supplying the grease to the grease supply point when the calculated workload exceeds the reference workload.

2. The automatic grease supply device according to claim 1, wherein the workload calculating unit is configured to obtain the workload by integrating a product of a thrust and a moving distance of a linear motor for driving the movable portion when the motor operates, with respect to operating time of the linear motor.

3. The automatic grease supply device according to claim 1, wherein the workload calculating unit is configured to obtain the workload by obtaining electric power of a motor for driving the movable portion and integrating the obtained electric power over operating time of the motor.

4. The automatic grease supply device according to claim 1, wherein the workload calculating unit is configured to obtain the workload, and
   multiply the obtained workload by at least one of a weighting factor corresponding to an index of a load or a weighting factor corresponding to an index of a stroke.

5. The automatic grease supply device according to claim 2, wherein the workload calculating unit is configured to obtain the workload, and
   multiply the obtained workload by at least one of a weighting factor corresponding to an index of a load or a weighting factor corresponding to an index of a stroke.

6. The automatic grease supply device according to claim 3, wherein the workload calculating unit is configured to obtain the workload, and
   multiply the obtained workload by at least one of a weighting factor corresponding to an index of a load or a weighting factor corresponding to an index of a stroke.

7. The automatic grease supply device according to claim 1, wherein the preset reference workload is obtained by any one of
   actually bringing the injection molding machine into operation and obtaining a relationship between the workload and a lubricated state,
   a calculation based on a specification of a mechanism portion at the grease supply point, or
   a simulation of operation of the injection molding machine.

8. The automatic grease supply device according to claim 1, wherein
   the grease supply command unit is configured to output the grease supply command for supplying the grease by (i) an amount with which old grease is replaced by a single supply or (ii) an amount with which the old grease is replaced by a plurality of supplies, and
   the preset reference value in (i) is larger than the preset reference value in (ii).

* * * * *